(No Model.)
H. TABOR.
SPEED GOVERNOR.
No. 309,895. Patented Dec. 30, 1884.
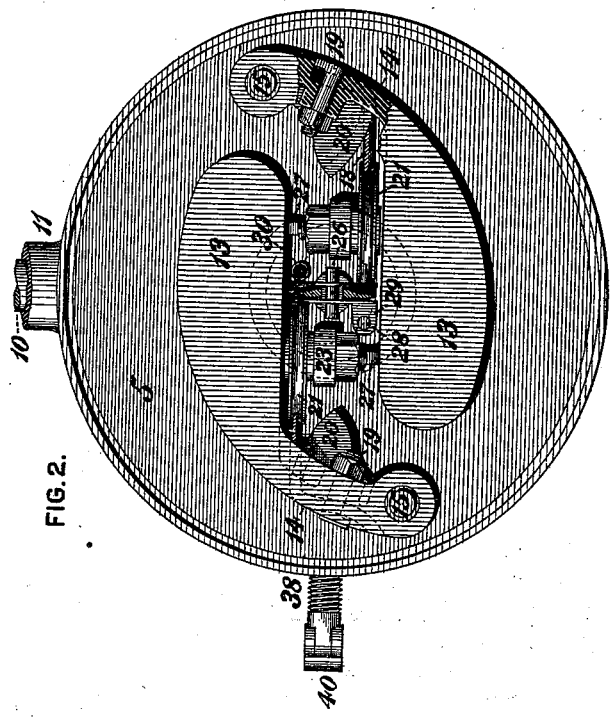
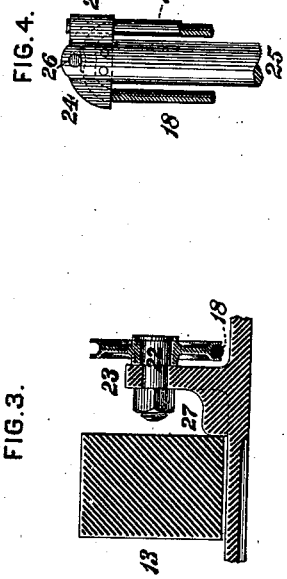
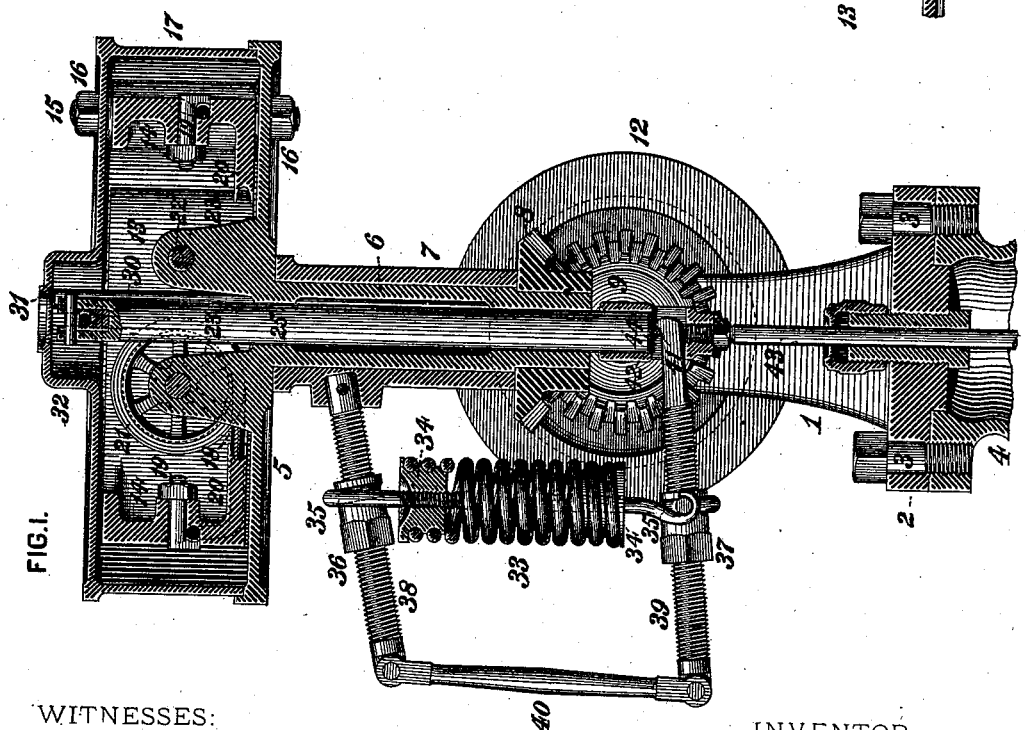
WITNESSES:
R. H. Whittlesey
C. N. Clarke
INVENTOR.
Harris Tabor,
BY J. Snowden Bell,
ATTORNEY.
N. PETERS, Photo-Lithographer, Washington, D. C.

UNITED STATES PATENT OFFICE.

HARRIS TABOR, OF ALLEGHENY, PENNSYLVANIA, ASSIGNOR TO THE TABOR MANUFACTURING COMPANY, OF NEW YORK, N. Y.

SPEED-GOVERNOR.

SPECIFICATION forming part of Letters Patent No. 309,895, dated December 30, 1884.

Application filed July 3, 1884. (No model.)

*To all whom it may concern:*

Be it known that I, HARRIS TABOR, of Allegheny, in the county of Allegheny and State of Pennsylvania, have invented certain new and useful Improvements in Speed-Governors, of which improvements the following is a specification.

My present invention is an improvement upon that for which Letters Patent of the United States No. 276,304 were granted and issued to me under date of April 24, 1883, and its object is to simplify the construction and perfect the operation of governors of the character of that set forth in said Letters Patent by the provision of improved means for effecting the transmission of centrifugal and centripetal action to the stem of the governor-valve, and varying the degree of centripetal force in accordance with desired variations in the speed of the mechanism regulated by the governor.

The improvements claimed are hereinafter fully set forth.

In the accompanying drawings, Figure 1 is a vertical section through a steam-engine governor embodying my invention, at the line *x x* of Fig. 2; Fig. 2, a plan or top view of the same with the case removed; Fig. 3, a vertical central section through a guide-sheave and its journal and standard, with one of the weights in transverse section; and Fig. 4, a view in elevation of the upper end of the regulating-stem and its attachments.

In the practice of my invention I provide a housing or standard, 1, which is cast upon or secured to a cap or head, 2, adapted to be connected by bolts 3 to the chest 4 of a governor-valve of any suitable and preferred construction. A weight-carrying plate or disk, 5, is fixed centrally upon the upper end of a tubular shaft, 6, which is mounted so as to rotate freely in a vertical bearing, 7, on the standard 1, and carries upon its lower end a bevel-pinion, 8, meshing with a corresponding pinion, 9, on a horizontal driving-shaft, 10, mounted in a bearing, 11, on the standard 1, and carrying a driving-pulley, 12, to which rotation is imparted by a belt from a rotating member of the mechanism to be regulated. Centrifugal force is applied for the operation of the governor by weights 13, fixed to weight-arms 14, and pivoted upon vertical bolts 15, secured to the disk 5 by nuts 16, said bolts serving the additional function of connecting to the disk a cylindrical closed top case, 17, which covers and protects the mechanism above the disk, and affords a neat external finish. The weights 13 are coupled one to the other by a flexible connection, 18, of wire rope or chain, which is clamped to each weight by a hook-headed bolt, 19, and, passing around segmentally-grooved guides 20 on the weights, is thence led around guide-sheaves 21, mounted on journals 22, fixed in standards 23 on the disk, to and over a socket, 24, fixed on the upper end of a vertical regulating-stem, 25, which fits freely within the tubular shaft 6 of the disk, and is secured to the socket 24 by a pin, 26, passing through said socket and through the end of the regulating-stem. Facings of soft metal are interposed between the connection 18 and the pin 26 and bolts 19, to prevent cutting or wear of the connection at those points.

It will be obvious that the outward movements of the weights under the influence of centrifugal force will impart a downward traverse to the regulating-stem 25, tending to close the governor-valve, and will be limited to the degree permitted by the length of the flexible connection 18, and the inward movement of the weights is limited by stops 27, formed on the lower ends of the standards 23 of the guide-sheaves. The stem 25 is guided by a rod, 28, fixed to the disk 5, and passing through a guide-block, 29, on the socket 24, and lubrication of the shaft 6 and its bearing is afforded by a pipe, 30, to which oil is supplied through an opening, 31, in and near the periphery of a shallow cup or recess formed in a central hub or projection, 32, on the top of the case 17.

In my Letters Patent No. 276,304, before referred to, the requisite centripetal action was exerted by a pair of mainsprings secured to the weights and to their supporting-disk, said springs not being accessible for adjustment during operation, and by a supplemental adjustable speeder-spring connected at one end to a rod fixed to the housing or standard, and at the other to a pivoted lever acting to move the regulating-stem in a direction opposite to that in which it was moved by the outward traverse of the weights due to centrifugal force.

Under my present invention the pair of mainsprings above specified are dispensed with, and the inward traverse of the weights is effected by a single spring, 33, which performs the functions of both the main and the supplemental springs of the former construction, said spring being of sufficient tension to exert the maximum centripetal force required, and being adapted to be varied in tension during the operation of the governor, and thereby to perform the additional function of a speeder-spring. The spring 33 is connected at each end to a nut, 34, which engages the threaded stem of a stirrup or clevis, 35, said stirrups fitting circumferential grooves in adjusting-nuts 36 37, which engage, respectively, screw-threads on a rod or stem, 38, fixed to the upper portion of the bearing 7, and on a speeder-lever, 39, which is coupled at its outer end by a link, 40, to the rod 38, and bears at its inner end against the lower side of a pin, 41, fixed in a block or socket, 42, which is connected to the upper end of the stem 43 of the governor-valve. The valve-stem 43 and block 42 are concentric with the regulating-stem 25, and the latter, which is fitted with the capacity of free rotation in the block 42, bears at its lower end upon a step, 44, of hard metal, fixed in the block above the pin 41.

In operation, outward movement of the weights about the axes of their pivot-bolts, effected by their centrifugal force in the rotation of the disk, will, through the flexible connection 18, depress the regulating-stem 25 and valve-stem 43, and close the governor-valve to a greater or less degree proportionately to the traverse of the weights. Upon a diminution of the exertion of centrifugal force the spring 33, by its bearing through the lever 39 on the pin 41, will elevate the regulating and valve stems, thereby effecting an inward traverse of the weights, and opening the governor-valve in a corresponding degree.

The construction above described complies with the requirements of close and accurate regulation to any determined speed for which the initial tension of the spring may be suited to afford the proper degree of centripetal force, and if, as in the instance illustrated, the rod 38 and speeder-lever 39 are inclined relatively one to the other, both the centripetal effect and the tension of the spring will be, as in my former patent, coincidently increased or diminished by the movement of the adjusting-nuts 36 37 toward or from the axis of the regulating-stem 25, the variation in the former particular being by reason of the increase of the leverage of the spring upon the speeder-lever, and in the latter by the extension of the spring resultant upon the divergence of the rod 38 and speeder-lever 39. The adjustability of the spring in such case enables the balance of centrifugal and centripetal forces to be maintained for different desired rates of speed, the spring fulfilling the functions of a "speeder-spring" by its capacity of variation of tension in accordance with variation of centripetal effect of the weights. If, however, changes in the speed to which the mechanism controlled by the governor is to be regulated are comparatively unfrequent and are limited to certain known conditions of degree, the relation of the rod 38 to the speeder-lever 39 in respect of parallelism or of divergence, when the weights are in position corresponding to the zero-point of their centrifugal force, will be immaterial, and may be determined in the discretion of the constructer. The governor will regulate in either case—that is to say, whether the rod and lever are parallel or are divergent—to maintain a determined rate of speed, and variation thereof may be effected from time to time, as desired, by the substitution of springs of correspondingly greater or less tension.

It will be observed that a substantial structural economy is effected by the application of my improvements in the elimination of the mainsprings and gearing and screw and nut for rotating the regulating-stem, as employed in my former construction, without impairing the advantages attained thereby, and increased ease and sensitiveness in operation is attained by the simple and positive transmission of the regulating forces to the valve-stem.

I claim as my invention and desire to secure by Letters Patent—

1. The combination, in a centrifugal governor, of a rotating weight-carrier, a pair of weights pivoted thereto, a flexible connection coupling said weights one to the other and imparting movement therefrom to a regulating-stem in a plane perpendicular to the plane of movement of the weights about their pivots, and a spring exerting tension upon the regulating-stem in opposite direction to said flexible connection, substantially as set forth.

2. The combination, in a centrifugal governor, of a rotating weight-carrier, a pair of weights pivoted thereto, a flexible connection coupling said weights, and acting to impart downward movement to a regulating-stem under the influence of centrifugal force upon the weights, and an adjustable spring connected to a support which is fixed and external to the weight-carrier, and acting to impart upward movement to the regulating-stem, said spring being of such tension as to furnish the entire centripetal force exerted in the operation of the governor, substantially as set forth.

3. The combination, in a centrifugal governor, of a standard, a plate or a disk fitted to rotate therein, weights pivoted to said disk and coupled by a flexible connection having a downward bearing upon a regulating-stem, and a spring coupled at one end to a rod fixed to the standard, and at the other to a lever having an upward bearing upon the regulating-stem, substantially as set forth.

4. The combination, in a centrifugal governor, of a standard, a plate or disk fitted to rotate therein, a regulating-stem mounted centrally in said disk with the capacity of end movement relatively thereto, a pair of weights pivoted to said disk on opposite sides of said stem, a pair of guide-sheaves fitted to rotate on journals in said disk, a flexible connection united at its ends to the weights and passing around said sheaves and across the regulating-stem, a governor-valve stem bearing against the regulating-stem, and a spring exerting tension upon the regulating and valve stems in opposite direction to the flexible connection, substantially as set forth.

5. The combination, in a centrifugal governor, of a standard, a plate or disk fitted to rotate therein, weights pivoted to said disk and coupled by a flexible connection having a downward bearing upon a regulating-stem, a governor-valve stem bearing against said regulating-stem, a supporting-rod secured to the standard, a speeder-lever coupled at one end to said rod and abutting at the other against a bearing on the valve-stem, and a spring connected adjustably at its ends to the supporting-rod and the speeder-lever, respectively, substantially as set forth.

6. The combination, in a centrifugal governor, of a standard, a rotating weight-carrier and a weight pivoted thereto, a regulating-stem and a valve-stem receiving longitudinal movement from oscillations of the weight about its pivot, a threaded rod secured at one end to the standard, a threaded speeder-lever coupled at one end by a link to the opposite end of said rod and abutting at the other against a bearing in the line of the regulating and valve stems, nuts engaging the threads of said rod and speeder-lever, respectively, and a spring coupled at its ends to said nuts, substantially as set forth.

7. The combination, in a centrifugal governor, of a weight-carrying disk fixed on a hollow shaft, a regulating-stem fitting freely in said shaft, a grooved socket carrying a lateral guide-block and secured upon the end of the regulating-stem above the weight-carrying disk, and a rod or bar secured to the disk and fitting said guide-block, substantially as set forth.

8. The combination, in a centrifugal governor, of a weight-carrying disk, a pair of weights pivoted thereto and coupled by a flexible connection having a downward bearing upon a regulating-stem, and stops fixed to the disk between the weights and acting to limit the inward traverse thereof about their pivots, substantially as set forth.

9. The combination, in a centrifugal governor, of a rotating disk, and a governor-weight fixed upon one end of a curved or bent arm having a bearing at its opposite end fitting a pivot on the disk, and a segmental grooved guide concentric with said bearing and located between the same and the weight, substantially as set forth.

HARRIS TABOR.

Witnesses:
J. SNOWDEN BELL,
R. H. WHITTLESEY.